United States Patent
Kim et al.

(10) Patent No.: US 8,232,835 B2
(45) Date of Patent: Jul. 31, 2012

(54) CHARGE PUMP CIRCUIT AND VOLTAGE CONVERTER USING THE SAME

(75) Inventors: Hyoung-rae Kim, Hwaseong-si (KR); Hee-seok Han, Hwaseong-si (KR); Yoon-kyung Choi, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 415 days.

(21) Appl. No.: 12/652,267

(22) Filed: Jan. 5, 2010

(65) Prior Publication Data

US 2010/0171372 A1    Jul. 8, 2010

(30) Foreign Application Priority Data

Jan. 6, 2009    (KR) .................. 10-2009-0000843

(51) Int. Cl.
   *G05F 1/10* (2006.01)
(52) U.S. Cl. .................. 327/536; 363/60; 323/289
(58) Field of Classification Search .......... 323/222, 323/274–277, 282–289; 363/49, 50, 55, 363/56.05, 60, 65, 16–19; 327/530–536, 327/539–546, 330, 331, 137, 280, 336, 110
   See application file for complete search history.

(56) References Cited

U.S. PATENT DOCUMENTS

| | | | | |
|---|---|---|---|---|
| 5,838,147 A | * | 11/1998 | Suzuki et al. | 323/289 |
| 6,188,212 B1 | * | 2/2001 | Larson et al. | 323/281 |
| 6,259,612 B1 | * | 7/2001 | Itoh | 363/60 |
| 6,411,531 B1 | * | 6/2002 | Nork et al. | 363/60 |
| 6,650,555 B2 | * | 11/2003 | Suzuki et al. | 363/60 |

FOREIGN PATENT DOCUMENTS

| | | |
|---|---|---|
| JP | 2001-116777 | 4/2001 |
| JP | 2002-252967 | 6/2002 |
| JP | 2005-020886 | 1/2005 |
| JP | 2005-020922 | 1/2005 |

* cited by examiner

*Primary Examiner* — Rajnikant Patel
(74) *Attorney, Agent, or Firm* — Myers Bigel Sibley & Sajovec, P.A.

(57) ABSTRACT

An apparatus for generating a voltage required for a semiconductor device by using a voltage supplied from an external power supply is provided. A charge pump circuit includes a first circuit comprising a first capacitor and a first group of switching elements and controlling the first group of switching elements according to first and second switching signals to transfer a voltage charged in the first capacitor to a target terminal during a first period and to charge the first capacitor with a reference voltage applied to a first input terminal of the first capacitor during a second period, and a second circuit comprising a second capacitor, a third capacitor connected between an output terminal and a ground terminal and a second group of switching elements, and controlling the second group of switching elements according to the first and second switching signals to connect a first terminal of the second capacitor to the ground terminal during the first period, connect the first terminal of the second capacitor to a power supply voltage input terminal during the second period, connect a second terminal of the second capacitor to the power supply voltage input terminal when a voltage of the second terminal of the second capacitor is lower than a voltage of the target terminal during the first period, and connect the second terminal of the second capacitor to the output terminal during the second period.

10 Claims, 7 Drawing Sheets ically connecting the second node to a third node according to the first switching signal, and the first capacitor connected between the first node and the second node.

The third node may be connected to the first terminal of the second capacitor of the second circuit.

The first period and the second period may do not overlap each other.

The first and second switching signals may have phases opposite to each other and a period corresponding to a first logic state of the first switching signal may do not overlap with a period corresponding to a first logic state of the second switching signal.

The second circuit may include a fifth switching element selectively connecting the third node to the ground terminal according to the first switching signal, a sixth switching element selectively connecting the third node to the power supply voltage input terminal according to the second switching signal, a comparator comparing a voltage of a fourth node to the voltage of the target terminal and outputting a signal having a first logic value when the voltage of the target terminal is higher than the voltage of the fourth node, a logic switching element connecting the fourth node to the power supply voltage input terminal when both the output signal of the comparator and the first switching signal have a first logic value, a seventh switching element selectively connecting the fourth node to the output terminal according to the second switching signal, the second capacitor connected between the third node and the fourth node, and the third capacitor connected between the output terminal and the ground terminal.

The logic switching element may include a NAND gate performing an AND operation on the output signal of the comparator and the first switching signal and inverting the AND operation result and a transistor selectively connecting the power supply voltage input terminal and the fourth node according to a signal output from the NAND gate.

According to another aspect of the inventive concept, there is provided a voltage converter including a reference voltage generating circuit receiving a power supply voltage and generating a reference voltage and a charge pump circuit including a first capacitor, a second capacitor, a third capacitor that is connected between an output terminal and a ground terminal and a plurality of switching elements, transferring a voltage charged in the first capacitor to a target terminal during a first period according to first and second switching signals, charging the first capacitor with the reference voltage during a second period according to the first and second switching signals, connecting a first terminal of the second capacitor to the ground terminal during the first period, connecting the first terminal of the second capacitor to a power supply voltage input terminal during the second period, connecting a second terminal of the second capacitor to the power supply voltage input terminal when a voltage of the second terminal of the second capacitor is lower than a voltage of the target terminal during the first period, and connecting the second terminal of the second capacitor to the output terminal during the second period.

According to another aspect of the inventive concept, there is provided a voltage converter including a reference voltage generating circuit receiving a power supply voltage and generating a reference voltage, a charge pump circuit including a first capacitor, a second capacitor, a third capacitor connected between an output terminal and a ground terminal and a plurality of switching elements, transferring a voltage charged in the first capacitor to a target terminal during a first period according to first and second switching signals, charging the first capacitor with the reference voltage during a second period according to the first and second switching signals, connecting a first terminal of the second capacitor to the ground terminal during the first period, connecting the first terminal of the second capacitor to a power supply voltage input terminal during the second period, connecting a second terminal of the second capacitor to the power supply voltage input terminal when a voltage of the second terminal of the second capacitor is lower than a voltage of the target terminal during the first period, and connecting the second terminal of the second capacitor to the output terminal during the second period, and a feedback circuit varying the reference voltage generated by the reference voltage generating circuit based on a voltage of the output terminal.

The feedback circuit may include a determination unit detecting the voltage of the output terminal, determining whether the detected voltage belongs to a target voltage range and generating data corresponding to the determination result, and a voltage adjustment control signal generator generating a voltage adjustment control signal for varying the voltage output from the reference voltage generating circuit based on the data generated by the determination unit.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Embodiments of the inventive concept will be described in detail with reference to the attached drawings.

Figure 1:
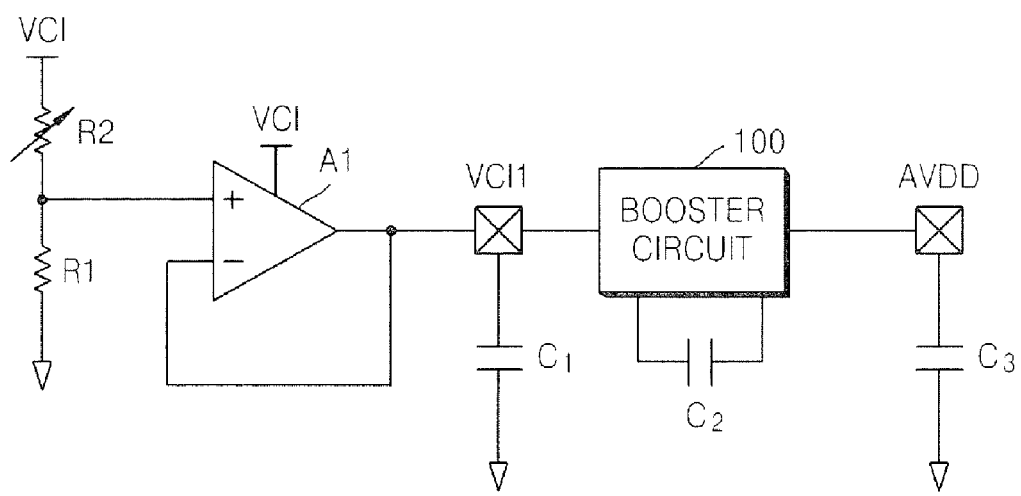
FIG. 1 illustrates a configuration of a voltage converter using a charge pump circuit in a booster circuit, according to an embodiment of the inventive concept.

FIG. 1 illustrates a configuration of a voltage converter using a charge pump circuit in a booster circuit 100, according to an embodiment of the inventive concept. Referring to FIG. 1, the voltage converter includes a resistor R1 and a variable resistor R2, a voltage follower A1, the booster circuit 100 having capacitors C2 and C3, and a capacitor C1 for a reference voltage output terminal.

The resistor R1 and the variable resistor R2 are elements for generating a reference voltage from a voltage VC1 (hereinafter referred to as 'power supply voltage') supplied from an external power supply. A desired reference voltage may be generated by varying the variable resistor R2.

The voltage follower A1 is a buffer circuit having a gain '1', and in which a voltage of an output terminal follows a voltage of an input terminal. The booster circuit 100 doubles a voltage applied to an input terminal thereof and may be configured in the form of a charge pump circuit, which is illustrated in FIG. 3 in more detail.

Figure 3:
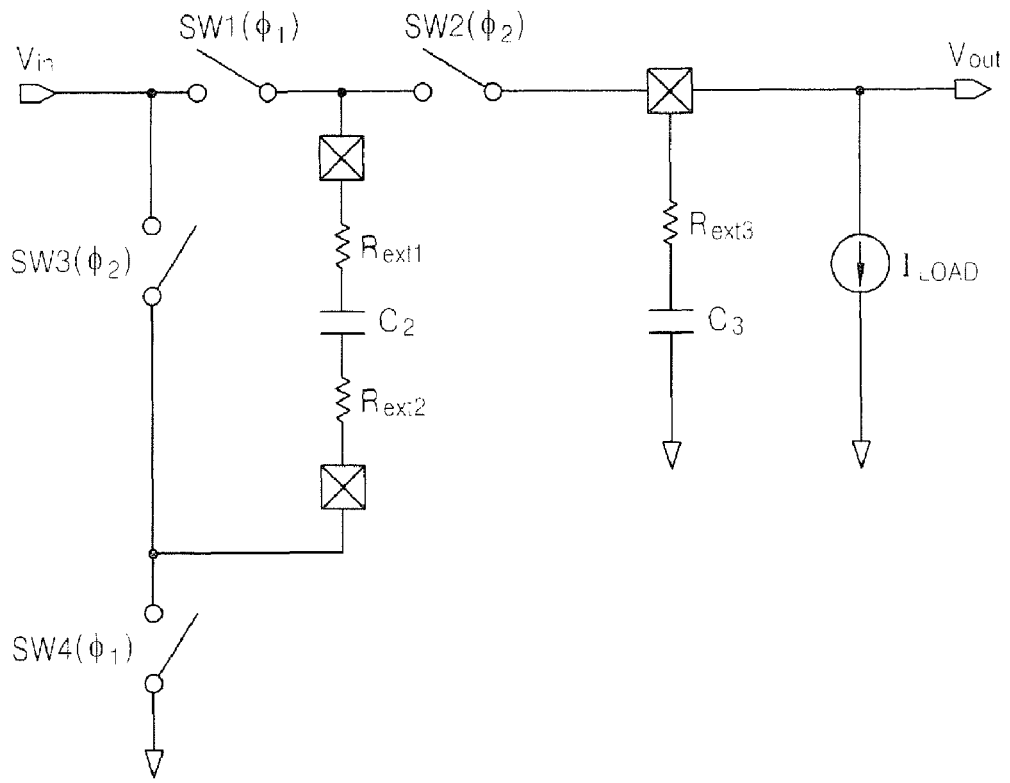
FIG. 3 is a circuit diagram of the booster circuit illustrated in FIG. 1.

Referring to FIG. 3, the charge pump circuit includes a plurality of switches SW1, SW2, SW3 and SW4 and the capacitors C2 and C3. In FIG. 3, $R_{ext1}$, $R_{ext2}$ and $R_{ext3}$ denotes internal resistors existing in pattern connecting pads and $I_{LOAD}$ represents a current flowing through a load connected to an output terminal of the charge pump circuit.

Figure 4:
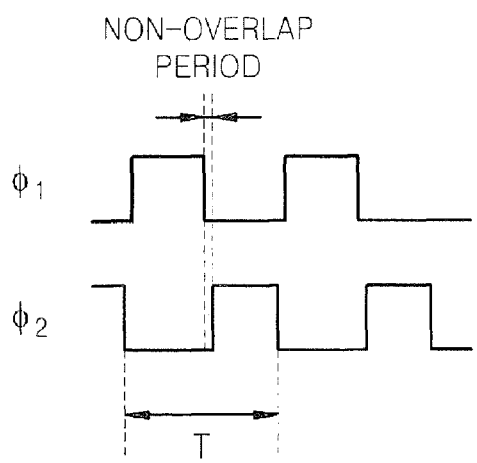
FIG. 4 illustrates timing of first and second switching signals applied to charge pump circuits according to embodiments of the inventive concept.

The switches SW1, SW2, SW3 AND SW4 illustrated in FIG. 3 are on or off according to first and second switching signals $\phi 1$ and $\phi 2$ having phases as shown in FIG. 4. Referring to FIG. 4, the first and second switching signals $\phi 1$ and $\phi 2$ have phases opposite to each other and have a non-overlap period in which their logic high states do not overlap each other. Although the switches SW1, SW2, SW3 AND SW4 are on when the first and second switching signals $\phi 1$ and $\phi 2$ are logic high in the current embodiment of the inventive concept; however, the present invention is not limited thereto and thus the switches may be on when the first and second switching signals $\phi 1$ and $\phi 2$ are logic low.

The charge pump circuit illustrated in FIG. 3 will now be explained according to the timing of the first and second switching signals $\phi 1$ and $\phi 2$ illustrated in FIG. 4.

The switches SW1 and SW4 are on and the switches SW2 and SW3 are off during a charging period in which the first switching signal $\phi 1$ is logic high and the second switching signal $\phi 2$ is logic low, and thus the capacitor C2 is charged with a voltage applied to an input terminal Vin during the charging period.

The switches SW1 and SW4 are off and the switches SW2 and SW3 are on during a pumping period in which the first switching signal $\phi 1$ is logic low and the second switching signal $\phi 2$ is logic high, and thus the voltage applied to the input terminal Vin is added to the voltage charged in the capacitor C2 and transferred to an output terminal Vout during the pumping period. Accordingly, the capacitor C3 connected to the output terminal Vout is charged with a voltage corresponding to twice the voltage applied to the input terminal Vin.

A single period T may include a single charging period and a single pumping period that do not overlap each other.

The voltage converter illustrated in FIG. 1 may generate a constant output voltage AVDD all the time irrespective of the power supply voltage VCI and stably operate since the voltage converter is of open loop type.

However, the output voltage AVDD of the voltage converter illustrated in FIG. 1 has ripples according to a load current $I_{LOAD}$, and the voltage converter deteriorates power efficiency because of a reference voltage VCI1 and requires the external capacitor C1 connected to the reference voltage output terminal.

Figure 2:
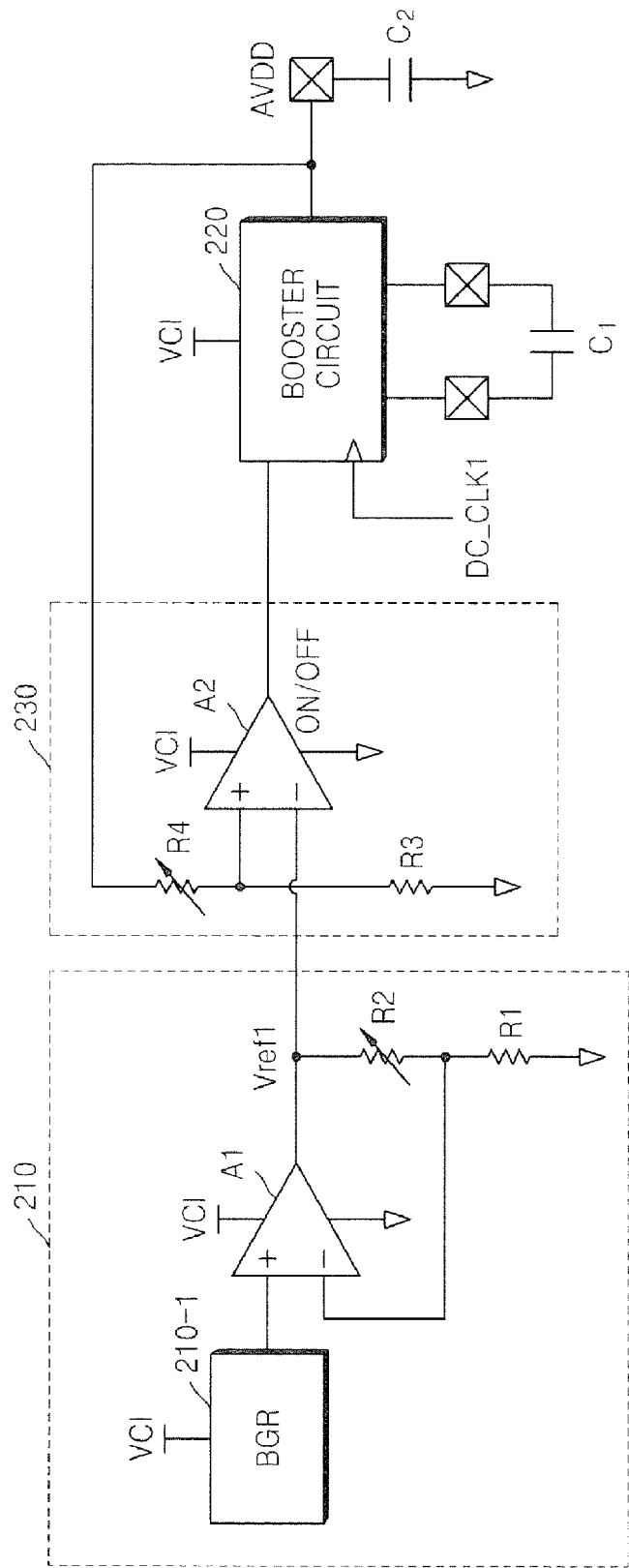
FIG. 2 illustrates a configuration of a voltage converter using a charge pump circuit in a booster circuit, according to another embodiment of the inventive concept.

Accordingly, a voltage converter illustrated in FIG. 2 is proposed.

FIG. 2 illustrates a configuration of the voltage converter using a charge pump circuit in a booster circuit 220, according to another embodiment of the inventive concept. Referring to FIG. 2, the voltage converter includes a reference voltage generating circuit 210, the booster circuit 220 having capacitors C1 and C2, and a comparator circuit 230.

The reference voltage generating circuit 210 includes an amplifying circuit composed of a band gap reference voltage generator 210-1, an operational amplifier A1 and a resistor R1 and a variable resistor R2. The comparator circuit 230 includes an operational amplifier A2 and a resistor R3 and a variable resistor R4.

A reference voltage $V_{ref1}$ generated by the reference voltage generating circuit 210 is applied to a negative input terminal of the operational amplifier A2 of the comparator circuit 230, and an output voltage AVDD is detected and applied to a positive input terminal of the operational amplifier A2 of the comparator circuit 230. The operational amplifier A2 of the comparator circuit 230 compares voltages of the positive and negative input terminals, outputs a signal according to the comparison result and turns on/off the booster circuit 220 corresponding to the charge pump circuit by using the output signal to stabilize the output voltage AVDD.

The voltage converter illustrated in FIG. 2 may generate a constant output voltage AVDD all the time irrespective of the power supply voltage VCI. Furthermore, the voltage converter illustrated in FIG. 2 improves power efficiency because the reference voltage VCI1 is not generated and does not require the external capacitor $C_1$ connected to the reference voltage output terminal, as compared to the voltage converter illustrated in FIG. 1.

However, the output voltage AVDD of the voltage converter illustrated in FIG. 2 may have large ripples according to a load condition. Though the voltage converter illustrated in FIG. 1 may generate ripples, these ripples do not cause trouble because the ripples are uniformly generated according to a load variation. In the voltage converter illustrated in FIG. 2, however, the ripples may deteriorate the quality of the circuit if the ripples are randomly generated or have large amplitudes.

Figure 5:
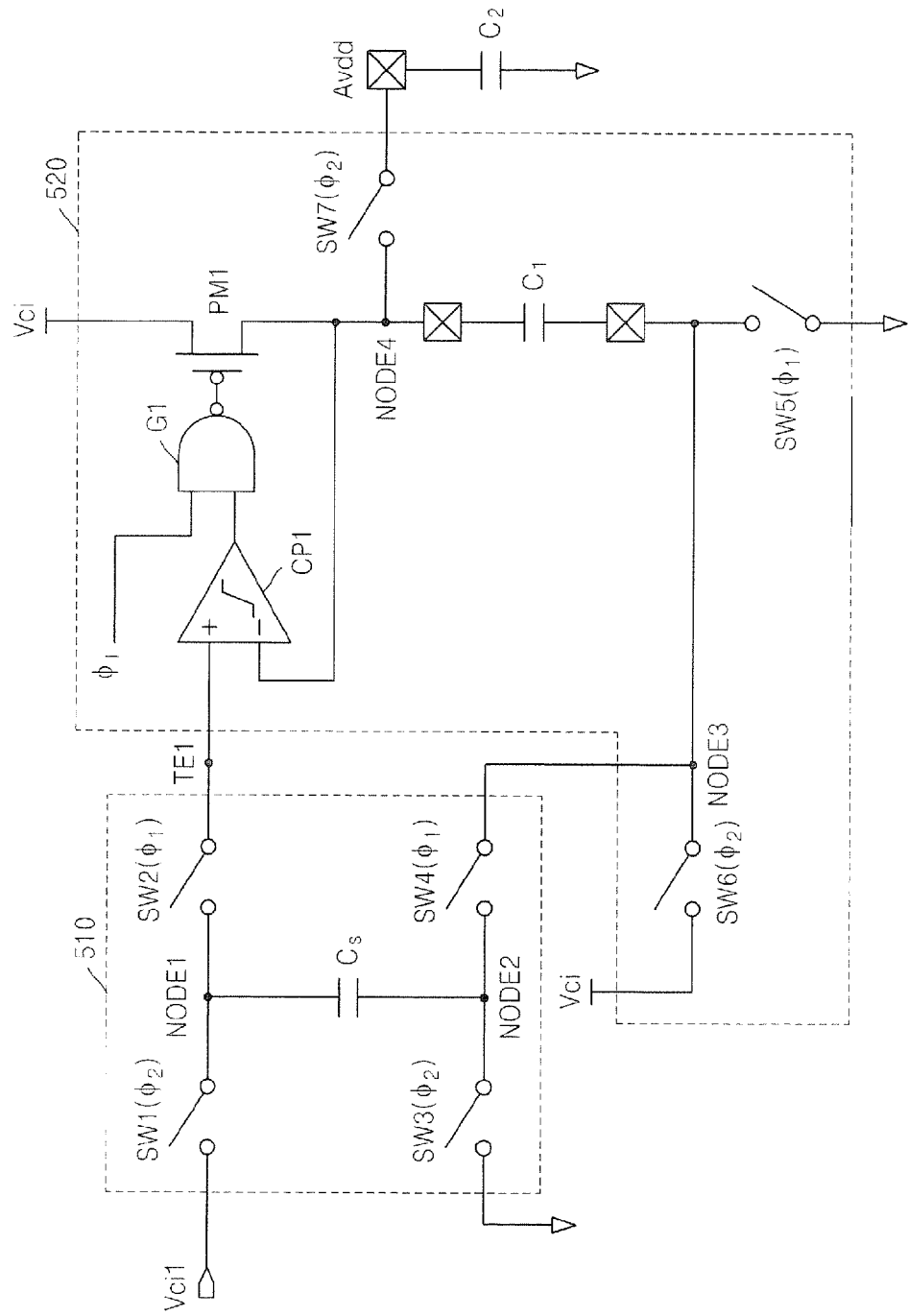
FIG. 5 illustrates a configuration of a charge pump circuit according to another embodiment of the inventive concept.

The inventive concept proposes a new charge pump circuit employing the advantages of the circuits illustrated in FIGS. 1 and 2. FIG. 5 illustrates a configuration of a charge pump circuit according to another embodiment of the inventive concept.

Referring to FIG. 5, the charge pump circuit according to the present embodiment of the inventive concept includes a first circuit block 510, a second circuit block 520 and a capacitor C2 connected to an output terminal. Switches included in the charge pump circuit are on/off according to the timing of first and second switching signals $\phi 1$ and $\phi 2$ illustrated in FIG. 4. A power supply voltage Vci applied to the charge pump circuit is constant because an output voltage of a voltage regulator is used as the power supply voltage Vci.

The first circuit block 510 includes a plurality of switches SW1, SW1, SW3 and SW4 and a capacitor Cs. Specifically, the capacitor Cs is connected between a first node NODE1 and a second node NODE2, the switch SW1 is connected between an input terminal to which a reference voltage Vci1 is applied and the first node NODE1, and the switch SW2 is connected between the first node NODE1 and a first terminal TE1 of the first circuit block 510. In addition, the switch SW3 is coupled between the second node NODE2 and a ground terminal and the switch SW4 is coupled between the second node NODE2 and a third node NODE3. The switches SW2 and SW4 are on/off according to the first switching signal $\phi 1$ and the switches SW1 and SW3 are on/off according to the second switching signal $\phi 2$.

The second circuit block 520 includes a plurality of switches SW5, SW6 and SW7, a capacitor C1, a comparator CP1, a NAND gate G1 and a transistor PM1. Specifically, the capacitor C1 is coupled between the third node NODE3 and a fourth node NODE4, the switch SW5 is coupled between the third node NODE3 and the ground terminal, the switch SW6 is coupled between the third node NODE3 and an input terminal to which the power supply voltage Vci is applied, and the switch SW7 is coupled between the fourth node NODE4 and the output terminal. The first terminal TE1 is connected to a positive input terminal of the comparator CP1 and the fourth node NODE4 is connected to a negative input terminal of the comparator CP1. The first switching signal $\phi 1$ is applied to a first input terminal of the NAND gate G1 and an output terminal of the comparator CP1 is connected to a second input terminal of the NAND gate G1. An output terminal of the NAND gate G1 is connected to a gate of the transistor PM1, the power supply voltage Vci is applied to a source of the transistor PM1 and the fourth node NODE4 is connected to a drain of the transistor PM1. The switch SW5 is on/off according to the first switching signal $\phi 1$ and the switches SW6 and SW7 are on/off according to the second switching signal $\phi 2$. The operation of the first circuit block 510 will now be explained according to logic states of the first and second switching signals $\phi 1$ and $\phi 2$. In the first circuit block 510, the switches SW1 and SW3 are on and the switches SW2 and SW4 are off during a period in which the first switching signal $\phi 1$ is logic low and the second switching signal $\phi 2$ is logic high, and thus the capacitor Cs is charged with the reference voltage Vci1 applied to the input terminal during this period. The switches SW1 and SW3 are off and the switches SW2 and SW4 are on during a period in which the first switching signal $\phi 1$ is logic high and the second switching signal $\phi 2$ is logic low, and thus the voltage of the first node NODE1, which is charged in the capacitor Cs, is transferred to the first terminal TE1 during this period.

Next, the operation of the second circuit block 520 will now be explained according to logic states of the first and second switching signals $\phi 1$ and $\phi 2$.

The comparator CP1 compares a voltage of the fourth node NODE4 with the voltage of the first terminal TE1 and outputs a logic high signal only when the voltage of the first terminal TE1 is higher than the voltage of the fourth node NODE4. The NAND gate G1 performs an AND operation on the output signal of the comparator CP1 and the first switching signal $\phi 1$ and inverts the AND operation result. Since the output terminal of the NAND gate G1 is connected to the gate of the transistor PM1, the transistor PM1 is turned on only when the NAND gate G1 outputs a logic low signal and turned off when the NAND gate G1 outputs a logic high signal. Accordingly, the transistor PM1 is turned on only when the voltage of the first terminal TE1 is higher than the voltage of the fourth node NODE4 and turned off otherwise during a period in which the first switching signal $\phi 1$ is logic high. In the second circuit block 520, the switch SW5 is on and the switches SW6 and SW7 are off when the first switching signal $\phi 1$ is logic high and the second switching signal $\phi 2$ is logic low, respectively.

Accordingly, the transistor PM1 is turned on and thus the capacitor C1 is charged with the power supply voltage Vci only when the voltage of the first terminal TE1 is higher than the voltage of the fourth node NODE4 and the capacitor C1 is not charged otherwise during a period in which the first switching signal $\phi 1$ is logic high and the second switching signal $\phi 2$ is logic low. According to this operation, the voltage of the fourth node NODE4 to which the capacitor C1 is connected follows the voltage of the first terminal TE1, that is, the reference voltage Vci1.

The switch SW5 is off, and the switches SW6 and SW7 are on and the transistor PM1 is turned off during a period in which the first switching signal $\phi 1$ is logic low and the second switching signal $\phi 2$ is logic high. Accordingly, the power supply voltage Vci is transferred to the third node NODE3, added to the voltage of the fourth node NODE4, which is charged in the capacitor C1, and transmitted to the output terminal to which the capacitor C2 is connected during the period in which the first switching signal φ1 is logic low and the second switching signal φ2 is logic high. As described above, the voltage of the fourth node NODE4 follows the reference voltage Vci1, and thus the voltage Avdd of the output terminal corresponds to the sum of the power supply voltage Vci and the reference voltage Vci1. The switch SW4 of the first circuit block 510 is not directly connected between the second node NODE2 and the ground terminal and connected between the second node NODE2 and the third node NODE3 in order to prevent a voltage difference between both input terminals of the capacitor C1 from becoming lower than the desired reference voltage Vci1. This is because the voltage of the negative input terminal of the capacitor C1 increases with the voltage of the third node NODE3 although the positive input terminal of the capacitor C1 is equal to the reference voltage Vci1 if the voltage of the third node NODE3 increases due to the on resistance of the switch SW5 when the capacitor C1 is charged while the first switching signal φ1 is logic high.

A voltage converter using the charge pump circuit illustrated in FIG. 5 will now be explained.

Figure 6:
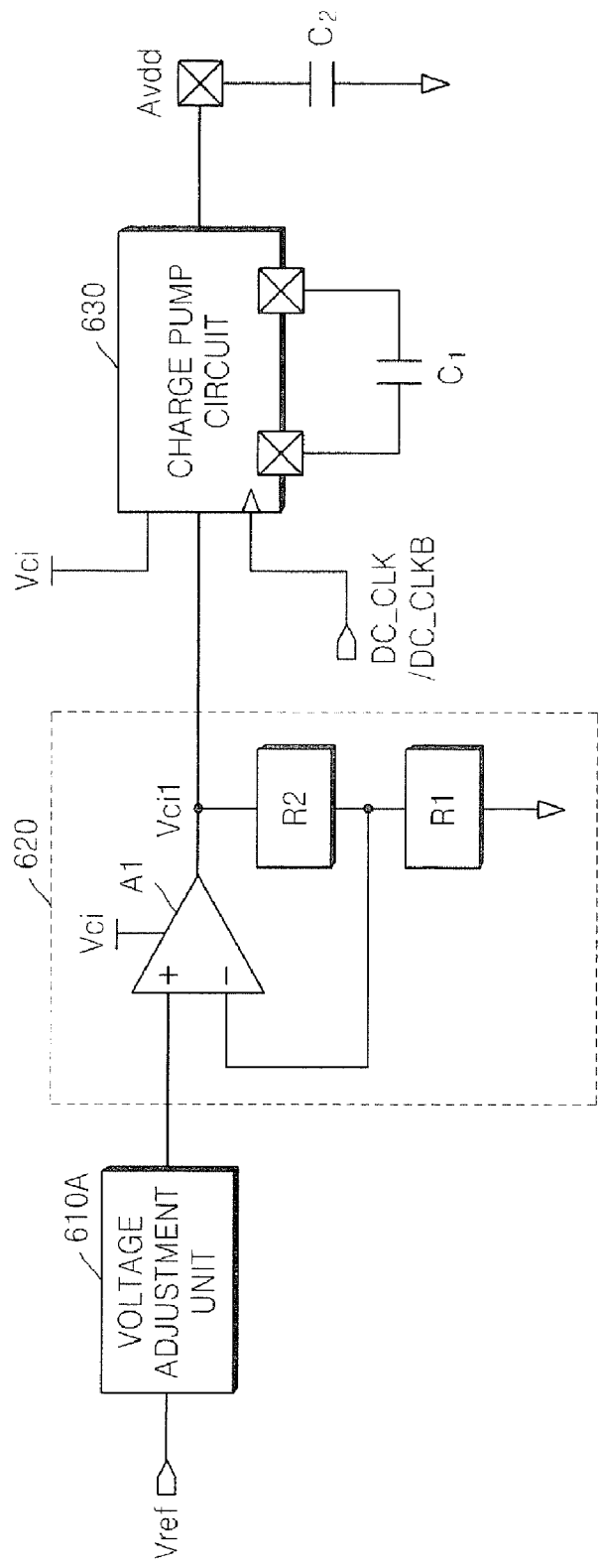
FIG. 6 illustrates a configuration of an open loop voltage converter using the charge pump circuit illustrated in FIG. 5, according to an embodiment of the inventive concept.

FIG. 6 illustrates a configuration of an open loop voltage converter using the charge pump circuit illustrated in FIG. 5, according to an embodiment of the inventive concept. Referring to FIG. 6, the open loop voltage converter includes a voltage adjustment 610, an amplification unit 620, and a charge pump circuit 630 having capacitors C1 and C2. The voltage adjustment 610 changes a reference voltage Vref input thereto to a desired voltage. For example, the voltage adjustment 610 may be constructed in such a manner that a plurality of resistors are connected in series between an input terminal of the voltage adjustment 610 and a ground terminal and one of a plurality of connecting terminals to which the resistors are connected and the input terminal of the voltage adjustment 610 is selected as an output terminal to change the reference voltage Vref.

The amplification unit 620 includes an operational amplifier A1 and resistors R1 and R2. A reference voltage Vci1 output from the amplification unit 620 may be represented according to Equation 1.

$$Vci1 = Vref\left(1 + \frac{R_2}{R_1}\right) \quad \text{[Equation 1]}$$

\The charge pump circuit 630 may use the charge pump circuit illustrated in FIG. 5. In FIG. 6, signals DC_CLK and CD_CLKB respectively correspond to the first and second switching signals φ1 and φ2 illustrated in FIG. 5. In the open loop voltage converter using the charge pump circuit illustrated in FIG. 5, an output voltage Avdd corresponds to the sum of a power supply voltage Vci and the reference voltage Vci1 according to Equation 2. That is, the output voltage Avdd is directly affected by a variation in the power supply voltage Vci.

$$Avdd = Vci + Vci1 \quad \text{[Equation 2]}$$

Accordingly, constant ripples are generated according to a load variation. Furthermore, an external capacitor is not required for the reference voltage output terminal.

The power supply voltage Vci is constant because the power supply voltage Vci corresponds to the output voltage of the voltage regulator. However, if the power supply voltage Vci varies with time, a variation in the power supply voltage Vci directly affects the output voltage Avdd. The open loop voltage converter, as illustrated in FIG. 6, cannot compensate for a variation in the output voltage Avdd due to a change in the power supply voltage Vci.

Accordingly, the inventive concept proposes a closed loop voltage converter using the charge pump circuit illustrated in FIG. 5 to compensate for a variation in the output voltage Avdd due to a change in the power supply voltage Vci.

Figure 7:
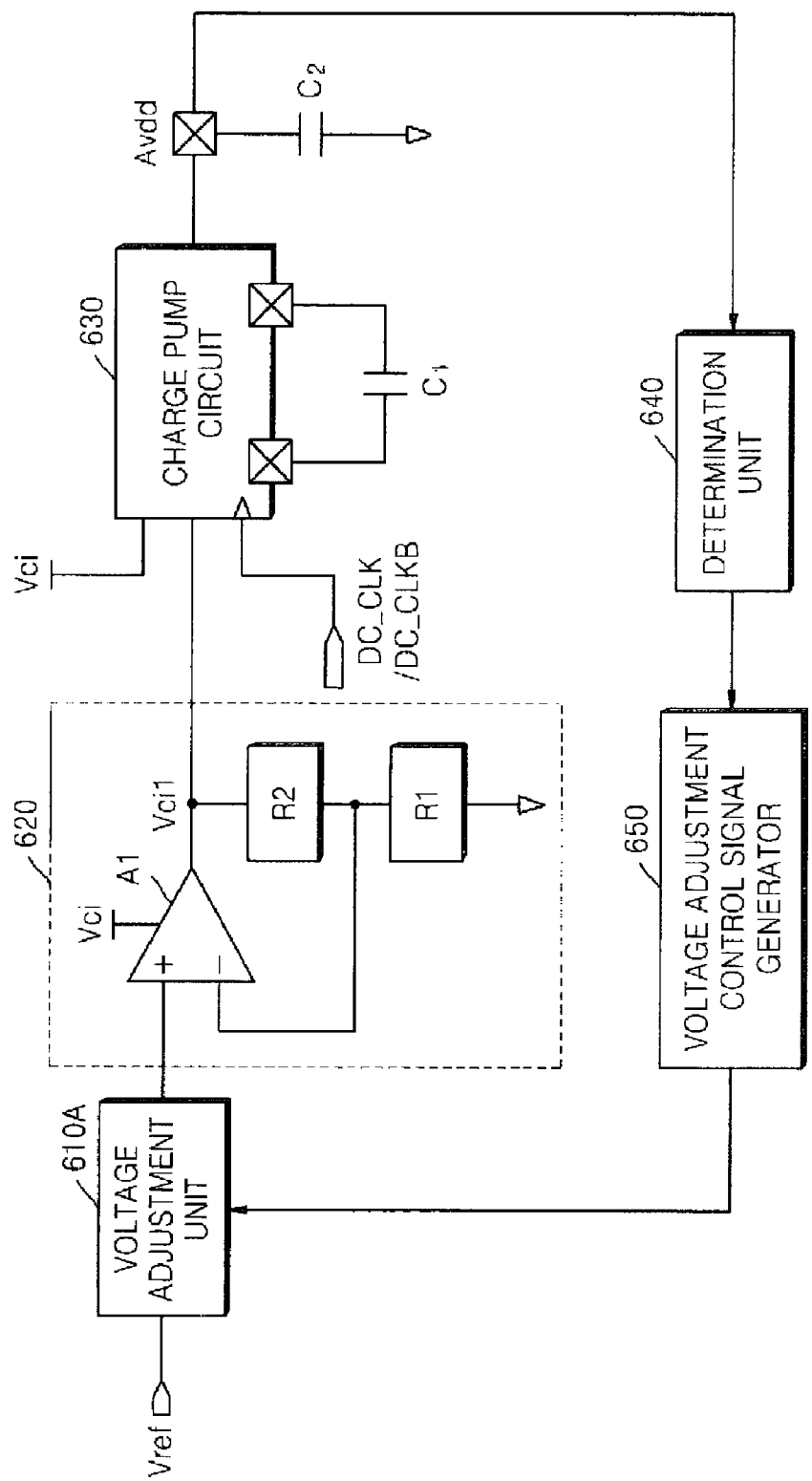
FIG. 7 illustrates a configuration of a closed loop voltage converter using the charge pump circuit illustrated in FIG. 5, according to an embodiment of the inventive concept.

FIG. 7 illustrates a configuration of the closed loop voltage converter using the charge pump circuit illustrated in FIG. 5, according to an embodiment of the present invention.

Referring to FIG. 7, the closed loop voltage converter includes a voltage adjustment 610A, an amplification unit 620, a charge pump circuit 630 having capacitors C1 and C2, a determination unit 640 and a voltage adjustment control signal generator 650. The amplification unit 620 and the charge pump circuit 630 are identical to those of the voltage converter illustrated in FIG. 6 so that explanations thereof are omitted. The voltage adjustment 610A varies a reference voltage Vref applied thereto according to a voltage regulation control signal. For instance, the voltage regulator 610A may be constructed in such a manner that a plurality of resistors are connected in series between an input terminal and a ground terminal and one of a plurality of connecting terminals to which the resistors are connected and the input terminal is determined as an output terminal according to the voltage regulation control signal.

The determination unit 640 detects an output voltage Avdd, determines whether the output voltage Avdd belongs to a target voltage range, and generates a signal corresponding to the determination result.

Figure 8:
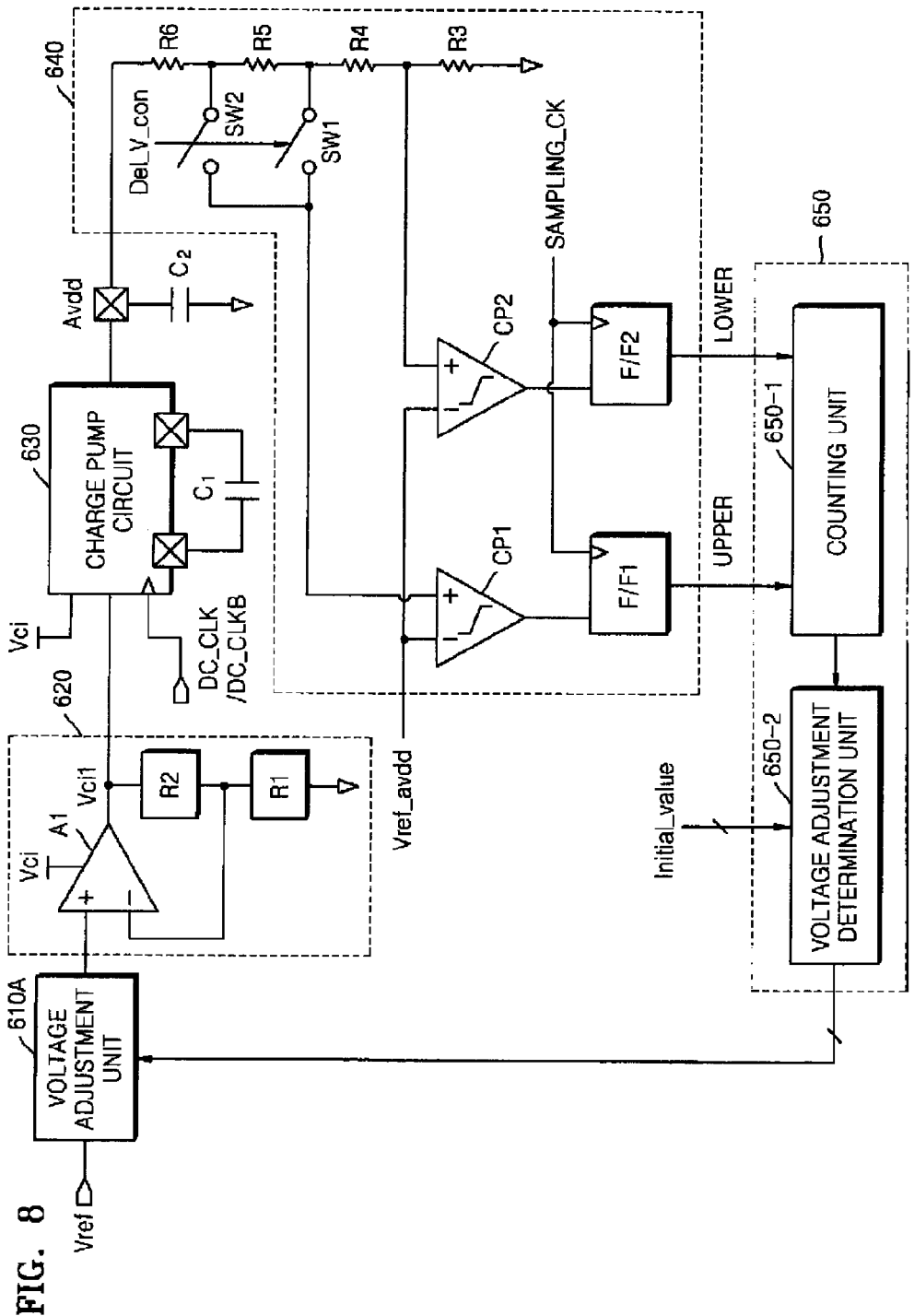
FIG. 8 illustrates a configuration of a feedback circuit illustrated in FIG. 7 in more detail.

The voltage adjustment control signal generator 650 generates the voltage regulation control signal for changing or maintaining the current output voltage Avdd based on the signal output from the determination unit 640. Detailed configurations of the determination unit 640 and the voltage adjustment control signal generator 650 are illustrated in FIG. 8. The operations of the determination unit 640 and the voltage regulation control signal generator 650 will now be explained with reference to FIG. 8.

The voltage adjustment 610A, the amplification unit 620 and the charge pump circuit 630 are identical to those illustrated in FIG. 7 so that explanations thereof are omitted.

The determination unit 640 includes a plurality of resistors R3, R4, R5 and R6, a plurality of switches SW1 and SW2, comparators CP1 and CP2 and flip-flops F/F1 and F/F2. The resistors R3, R4, R5 and R6 are connected in series between the output terminal and the ground terminal.

The target voltage range is determined based on the resistances of the resistors R4 and R5, and thus the resistors R4 and R5 may have resistances smaller than those of the resistors R3 and R6. The switches SW1 and SW2 vary the target voltage range. Here, the target voltage range is widened when the switch SW2 is selected. Accordingly, the switch SW1 is selected in order to generate an output voltage with a narrow swing width.

The comparator CP1 determines whether the detected output voltage Avdd exceeds the upper limit of the target voltage range and the comparator CP2 determines whether the detected output voltage Avdd is lower than the lower limit of the target voltage range. A voltage Vref-avdd applied to negative input terminals of the comparators CP1 and CP2 is determined as a voltage corresponding to half of a voltage which is applied to positive input terminals of the comparators CP1 and CP2 for generating a desired output voltage.

The comparators CP1 and CP2 output logic high signals only when the voltage input to their positive input terminals is higher than the voltage Vref-avdd input to their negative input terminals and output logic low signals otherwise.

The flip-flops F/F1 and F/F2 respectively output the output signals of the comparators CP1 and CP2 in synchronization with a sampling clock signal SAMPLING_CK. A combination of the signals output from the flip-flops F/F1 and F/F2 represents whether the output voltage Avdd belongs to the target voltage range.

Specifically, it is determined that the output voltage Avdd exceeds the target voltage range if both the output signals of the flip-flops F/F1 and F/F2 are logic high. It is determined that the output voltage Avdd belongs to the target voltage range if the output signal of the flip-flop F/F1 is logic high and the output signal of the flip-flop F/F2 is logic low. Furthermore, it is determined that the output voltage Avdd is lower than the target voltage range if both the output signals of the flip-flops F/F1 and F/F2 are logic low. If the output signal of the flip-flop F/F1 is logic low and the output signal of the flip-flop F/F2 is logic high, it is determined that an error occurred, which is ignored.

The voltage adjustment control signal generator 650 generates the voltage adjustment control signal by using the signals output from the flip-flops F/F1 and F/F2. Specifically, the voltage adjustment control signal generator 650 includes a counting unit 650-1 and a voltage adjustment determination unit 650-2.

The counting unit 650-1 counts the number N1 of logic high states of the output signals of the flip-flops F/F1 and F/F2 during a period corresponding to N clock pulses of the sampling clock signal SAMPLING_CK. In addition, the counting unit 650-1 counts the number N2 of logic low states of the output signals of the flip-flops F/F1 and F/F2 during the period corresponding to N clock pulses of the sampling clock signal SAMPLING_CK. The sampling clock signal SAMPLING_CK has a considerably low frequency as compared to a response speed of an open loop system in order to secure stability of the closed loop system.

The voltage adjustment determination unit 650-2 compares the counted results N1 and N2 with a predetermined value and generates a voltage adjustment control signal corresponding to the comparison result. The voltage adjustment control signal is generated according to an initial value Initial_value when the system is initialized.

Specifically, the voltage adjustment determination unit 650-2 compares the numbers N1 and N2 with $\alpha*N$. Here, $0.5<\alpha<1$. The output voltage is controlled more sensitively as $\alpha$ decreases. A voltage adjustment control signal for decreasing the output voltage Avdd is generated if $N1>\alpha*N$ and a voltage adjustment control signal for increasing the output voltage Avdd is generated if $N2>\alpha*N$. A voltage adjustment control signal for maintaining the current output voltage is generated otherwise.

The voltage adjustment 610A regulates the output voltage according to the voltage adjustment control signal generated as described above. Accordingly, a variation in the output voltage Avdd due to a change in the power supply voltage Vci can be compensated in the above-described closed loop system.

The switches described in the embodiments of the inventive concept may be configured using semiconductor devices, specifically, transistors.

While the inventive concept has been particularly shown and described with reference to exemplary embodiments thereof, it will be understood that various changes in form and details may be made therein without departing from the spirit and scope of the following claims.

What is claimed is:

1. A charge pump circuit comprising:
a first circuit comprising a first capacitor and a first group of switching elements and controlling the first group of switching elements according to first and second switching signals to transfer a voltage charged in the first capacitor to a target terminal during a first period and to charge the first capacitor with a reference voltage applied to a first input terminal during a second period; and
a second circuit comprising a second capacitor, a third capacitor connected between an output terminal and a ground terminal and a second group of switching elements, and controlling the second group of switching elements according to the first and second switching signals to connect a first terminal of the second capacitor to the ground terminal during the first period, connect the first terminal of the second capacitor to a power supply voltage input terminal during the second period, connect a second terminal of the second capacitor to the power supply voltage input terminal when a voltage of the second terminal of the second capacitor is lower than a voltage of the target terminal during the first period, and connect the second terminal of the second capacitor to the output terminal during the second period.

2. The charge pump circuit of claim 1, wherein the first circuit comprises:
a first switching element selectively connecting the first input terminal to which the reference voltage is applied to a first node according to the second switching signal;
a second switching element selectively connecting the first node to the target terminal according to the first switching signal;
a third switching element selectively connecting a second node to the ground terminal according to the second switching signal;
a fourth switching element selectively connecting the second node to a third node according to the first switching signal; and
the first capacitor connected between the first node and the second node.

3. The charge pump circuit of claim 2, wherein the third node is connected to the first terminal of the second capacitor of the second circuit.

4. The charge pump circuit of claim 1, wherein the first period and the second period do not overlap each other.

5. The charge pump circuit of claim 1, wherein the first and second switching signals have phases opposite to each other, and a period corresponding to a first logic state of the first switching signal does not overlap with a period corresponding to a first logic state of the second switching signal.

6. The charge pump circuit of claim 1, wherein the second circuit comprises:
a fifth switching element selectively connecting the third node to the ground terminal according to the first switching signal;
a sixth switching element selectively connecting the third node to the power supply voltage input terminal according to the second switching signal;
a comparator comparing a voltage of a fourth node to the voltage of the target terminal and outputting a signal having a first logic value when the voltage of the target terminal is higher than the voltage of the fourth node;
a logic switching element connecting the fourth node to the power supply voltage input terminal when both the output signal of the comparator and the first switching signal have a first logic value;

a seventh switching element selectively connecting the fourth node to the output terminal according to the second switching signal;
the second capacitor connected between the third node and the fourth node; and
the third capacitor connected between the output terminal and the ground terminal.

7. The charge pump circuit of claim 6, wherein the logic switching element comprises:
a NAND gate performing an AND operation on the output signal of the comparator and the first switching signal and inverting the AND operation result; and
a transistor selectively connecting the power supply voltage input terminal and the fourth node according to a signal output from the NAND gate.

8. A voltage converter comprising:
a reference voltage generating circuit receiving a power supply voltage and generating a reference voltage; and
a charge pump circuit comprising a first capacitor, a second capacitor, a third capacitor that is connected between an output terminal and a ground terminal and a plurality of switching elements, transferring a voltage charged in the first capacitor to a target terminal during a first period according to first and second switching signals, charging the first capacitor with the reference voltage during a second period according to the first and second switching signals, connecting a first terminal of the second capacitor to the ground terminal during the first period, connecting the first terminal of the second capacitor to a power supply voltage input terminal during the second period, connecting a second terminal of the second capacitor to the power supply voltage input terminal when a voltage of the second terminal of the second capacitor is lower than a voltage of the target terminal during the first period, and connecting the second terminal of the second capacitor to the output terminal during the second period.

9. A voltage converter comprising:
a reference voltage generating circuit receiving a power supply voltage and generating a reference voltage;
a charge pump circuit comprising a first capacitor, a second capacitor, a third capacitor connected between an output terminal and a ground terminal and a plurality of switching elements, transferring a voltage charged in the first capacitor to a target terminal during a first period according to first and second switching signals, charging the first capacitor with the reference voltage during a second period according to the first and second switching signals, connecting a first terminal of the second capacitor to the ground terminal during the first period, connecting the first terminal of the second capacitor to a power supply voltage input terminal during the second period, connecting a second terminal of the second capacitor to the power supply voltage input terminal when a voltage of the second terminal of the second capacitor is lower than a voltage of the target terminal during the first period, and connecting the second terminal of the second capacitor to the output terminal during the second period; and
a feedback circuit varying the reference voltage generated by the reference voltage generating circuit based on a voltage of the output terminal.

10. The voltage converter of claim 9, wherein the feedback circuit comprises:
a determination unit detecting the voltage of the output terminal, determining whether the detected voltage belongs to a target voltage range and generating data corresponding to the determination result; and
a voltage adjustment control signal generator generating a voltage adjustment control signal for varying the voltage output from the reference voltage generating circuit based on the data generated by the determination unit.

* * * * *